(12) United States Patent
Nugent et al.

(10) Patent No.: US 9,978,015 B2
(45) Date of Patent: May 22, 2018

(54) CORTICAL PROCESSING WITH THERMODYNAMIC RAM

(71) Applicant: KnowmTech, LLC, Albuquerque, NM (US)

(72) Inventors: Alex Nugent, Sante Fe, NM (US); Tim Molter, Oberstdorf (DE)

(73) Assignee: KnowmTech, LLC, Santa Fe, NM (US)

( * ) Notice: Subject to any disclaimer, the term of this patent is extended or adjusted under 35 U.S.C. 154(b) by 418 days.

(21) Appl. No.: 14/704,394

(22) Filed: May 5, 2015

(65) Prior Publication Data

US 2015/0347899 A1 Dec. 3, 2015

Related U.S. Application Data

(60) Provisional application No. 62/005,190, filed on May 30, 2014.

(51) Int. Cl.
  *G06F 15/18* (2006.01)
  *G06N 3/08* (2006.01)
  *G06N 3/063* (2006.01)

(52) U.S. Cl.
  CPC .................................. *G06N 3/063* (2013.01)

(58) Field of Classification Search
  CPC .......... G06N 3/06; G06N 3/063; G06N 3/049; G11C 13/0069
  USPC ......................................................... 706/25
  See application file for complete search history.

(56) References Cited

U.S. PATENT DOCUMENTS

| 8,909,580 | B2* | 12/2014 | Nugent | G06F 17/5022 706/46 |
| 8,972,316 | B2* | 3/2015 | Nugent | G06N 99/005 706/25 |
| 8,983,886 | B2* | 3/2015 | Nugent | G06F 15/16 434/323 |
| 8,990,136 | B2* | 3/2015 | Nugent | H04L 45/48 326/38 |
| 9,099,179 | B2* | 8/2015 | Nugent | G11C 13/0033 |
| 9,104,975 | B2* | 8/2015 | Nugent | G06N 3/063 |
| 9,152,917 | B2* | 10/2015 | Nugent | G06N 3/04 |
| 9,269,043 | B2* | 2/2016 | Nugent | G06N 3/049 |
| 9,280,748 | B2* | 3/2016 | Nugent | G06N 99/005 |
| 9,589,238 | B2* | 3/2017 | Nugent | G06N 99/005 |
| 9,679,241 | B2* | 6/2017 | Nugent | G06N 3/063 |

(Continued)

OTHER PUBLICATIONS

Cruz-Albrecht, Jose M., Timothy Derosier, and Narayan Srinivasa. "A scalable neural chip with synaptic electronics using CMOS integrated memristors." Nanotechnology 24, No. 38 (2013): 384011.*

(Continued)

*Primary Examiner* — Michael B Holmes
(74) *Attorney, Agent, or Firm* — Kermit D. Lopez; Luis M. Ortiz; Ortiz & Lopez, PLLC

(57) ABSTRACT

A thermodynamic RAM apparatus includes a physical substrate of addressable adaptive synapses that are temporarily partitioned to emulate adaptive neurons of arbitrary sizes, wherein the physical substrate mates electronically with a digital computing platform for high-throughput and low-power neuromorphic adaptive learning applications. The physical substrate addressable adaptive synapses can be configured as a part of a memristor-based physical neural processing unit.

11 Claims, 2 Drawing Sheets

(56) References Cited

U.S. PATENT DOCUMENTS

| | | | | |
|---|---|---|---|---|
| 9,679,242 B2* | 6/2017 | Nugent | .................. | G06N 3/063 |
| 9,706,918 B2* | 7/2017 | Myung | ................ | A61B 3/1208 |
| 2010/0277232 A1* | 11/2010 | Snider | .................. | G06N 3/0635 |
| | | | | 327/565 |
| 2013/0073497 A1* | 3/2013 | Akopyan | ............... | G06N 3/049 |
| | | | | 706/27 |
| 2014/0029328 A1* | 1/2014 | Ribeiro | .............. | G11C 13/0069 |
| | | | | 365/148 |

OTHER PUBLICATIONS

Intrinsic Tailing of Resistive States Distributions in Amorphous HfOx and TaOx Based Resistive Random Access Memories Sergiu Clima; Y. Y. Chen; A. Fantini; L. Goux; R. Degraeve; B. Govoreanu; G. Pourtois; M. Jurczak IEEE Electron Device Letters Year: 2015, vol. 36, Issue: 8 pp. 769-771 IEEE Journals & Magazines.*

Vacancy Cohesion-Isolation Phase Transition Upon Charge Injection and Removal in Binary Oxide-Based RRAM Filamentary-Type Switching Katsumasa Kamiya; Moon Young Yang; Blanka Magyari-Köpe; Masaaki Niwa; Yoshio Nishi; Kenji Shiraishi IEEE Transactions on Electron Devices Year: 2013, vol. 60, Issue: 10 pp. 3400-3406 IEEE Journals & Magazines.*

Percolative Model and Thermodynamic Analysis of Oxygen-Ion-Mediated Resistive Switching Nagarajan Raghavan; Kin Leong Pey; Xing Wu; Wenhu Liu; Michel Bosman IEEE Electron Device Letters Year: 2012, vol. 33, Issue: 5 pp. 712-714 IEEE Journals & Magazines.*

Demonstration of Low Power 3-bit Multilevel Cell Characteristics in a TaOx-Based RRAM by Stack Engineering Amit Prakash; Jaesung Park; Jeonghwan Song; Jiyong Woo; Eui-Jun Cha; Hyunsang Hwang IEEE Electron Device Letters Year: 2015, vol. 36, Issue: 1 pp. 32-34 IEEE Journals & Magazines.*

* cited by examiner

CORTICAL PROCESSING WITH THERMODYNAMIC RAM

CROSS-REFERENCE TO PROVISIONAL APPLICATION

This patent application claims priority under 35 U.S.C. 119(e) to U.S. Provisional Patent Application Ser. No. 62/005,190, entitled "Cortical Processing with Thermodynamic RAM," which was filed on May 30, 2014, the disclosure of which is incorporated herein by reference in its entirety.

STATEMENT OF GOVERNMENT RIGHTS

The United States Government has certain rights in this invention pursuant to Contract No. FA8750-13-C-0031 awarded by the United States Air Force

TECHNICAL FIELD

Embodiments are generally related to the field of AHaH (Anti-Hebbian and Hebbian) computing. Embodiments are additionally related to the field of thermodynamic RAM (Random Access Memory) also referred to as kT-RAM. Embodiments also relate to the field of machine learning.

BACKGROUND OF THE INVENTION

Using lures for hunting is rare in the animal kingdom and has been demonstrated in only a handful of species including primates, birds and crocodiles. This cognitive ability is just one example of causal understanding and advanced intelligence that many animals possess. This and other higher functions such as motor control, reasoning, perception and planning are credited to vastly different anatomical structures across animal groups. While the overall architecture may be different, the common denominator is the neuron and its connective topologies.

A neural processing unit (NPU) hardware device has been developed referred to as Thermodynamic RAM (kT-RAM), which provides a physical adaptive computing resource, allowing for the exploration of different neural architectures or modules built up from calls to kT-RAM's instruction set. kT-RAM is adaptive hardware operating on the principles of AHaH computing, a new technology where processor and memory are united. Much like a graphical processing unit (GPU) accelerates graphics, kT-RAM plugs into existing computer architectures to accelerate machine learning operations.

This opens up the possibility of providing computer hardware with the ability to perceive and act on information flows without being explicitly programmed. Much as a central processing unit (CPU) carries out instructions of a computer program to implement any arbitrary algorithm, kT-RAM is also general purpose, in that it does not enforce any specific network topology. The topology can be defined in software, and this flexibility allows for kT-RAM to be configured for different machine learning applications requiring different network topologies such as trees, forests, meshes, and hierarchies. A simple instruction set allows for various forms of synaptic adaptation, each useful within specific contexts.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for a thermodynamic RAM apparatus.

It is another aspect of the disclosed embodiments to provide for a thermodynamic RAM apparatus, which includes a physical substrate of addressable adaptive synapses that are temporarily partitioned to emulate adaptive neurons of arbitrary sizes.

It is another aspect of the disclosed embodiments to provide a physical substrate of a thermodynamic RAM apparatus, which mates electronically with a digital computing platform for high-throughput and low-power neuromorphic adaptive learning applications.

It is another aspect of the disclosed embodiments to provide a memristor-based physical NPU (Neural Processing Unit).

The aforementioned aspects and other objectives and advantages can now be achieved as described herein. Disclosed herein is a thermodynamic RAM (kTRAM)—a memristor-based physical neural processing unit (NPU). Thermodynamic RAM provides a physical substrate of addressable adaptive synapses that can be temporally partitioned in software to emulate adaptive neurons of arbitrary sizes, allowing one to explore the large space of possible cortical structures and topologies while taking advantage of hardware acceleration. The disclosed thermodynamic RAM can plug into existing digital computing platforms with its RAM-like form factor and enables high-throughput and low-power neuromorphic adaptive learning applications. Using a digital kT-RAM emulator with interchangeable core types, we demonstrate on-line classification using the MNIST hand written digits benchmark.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

kT-RAM is a resource for emulating AHaH nodes of arbitrary size via an AHaH circuit with a RAM interface. An AHaH circuit is built up from one or more synapses, which are implemented as serially connected memristors. Spike streams drive co-activation of synapses, and kT-RAM's instruction set allows for specification of adaptive feedback. The co-active synaptic weights are summed on the AHaH node's output electrode as an analog sum of currents providing both a state and a magnitude, which can be used to inform feedback.

We have previously shown demonstrations of clustering, classification, prediction, robotic actuation and combinatorial optimization benchmarks using AHaH computing and we have successfully mapped all these functions to the kT-RAM instruction set. As will be discussed herein, a classifier application can be implemented using a kT-RAM emulator, which is capable of unsupervised adaptation.

The architecture of thermodynamic RAM (kT-RAM) presented herein is a particular design that prioritizes flexibility and general utility above anything else, much in the same way that a CPU is designed for general purpose use. Different machine learning applications require different network topologies, and having a chip that can be configured for any desired network topology has the broadest general appeal across the field. The disclosed kT-RAM design uses a form factor and row and column address space mapping to specific bit cells as a basis to build upon. Converting RAM to kT-RAM requires the following steps:
1) the removal of the RAM reading circuitry,
2) minor design modifications of the RAM cells,
3) the addition of memristive synapses to the RAM cells,
4) the addition of H-Tree circuitry connecting the synapses,
5) and the addition of driving and output sensing circuitry.

Figure 1:
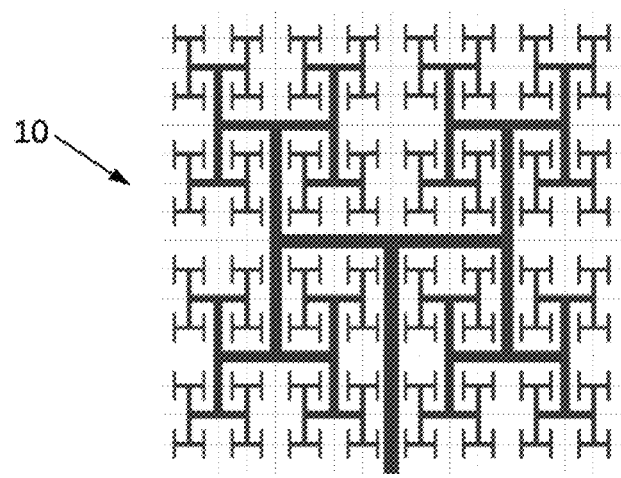
FIG. 1 illustrates a schematic diagram of a kT-RAM apparatus in accordance with a preferred embodiment.

FIG. 1 illustrates a schematic diagram of a kT-RAM apparatus 10 with its H-Tree sensing node connecting all the underlying synapses located at each cell in the RAM array, in accordance with a preferred embodiment. Note that an example H-Tree 12 is shown in FIG. 1. It can be appreciated that although a single example H-Tree 10 is depicted in FIG. 1, the kT-RAM apparatus 10 includes a multitude of K-Trees.

While at first glance it appears that this architecture may lead to one giant AHaH node per chip or core, the core can be partitioned into smaller AHaH nodes of arbitrary size by temporally partitioning sub portions of the tree. In other words, so long as it is guaranteed that synapses assigned to a particular AHaH node are never co-activated with other AHaH node partitions, these 'virtual' AHaH nodes can co-exist on the same physical core. This allows us to effectively exploit the extreme speed of modern electronics. Any desired network topology linking AHaH nodes together can be achieved by the same temporal partitioning concept. Software enforces the constraints, while the hardware remains flexible.

Thermodynamic RAM utilizes standard RAM technology for synaptic activation over a two-dimensional address space (light gray cells). The fractal H-Tree wire shown in FIG. 1 forms a common electrical node for summing the synaptic weights of an AHaH node (neuron) and also for providing a learning/feedback signal. In FIG. 1, an example 16×16 cell array is shown, but in practice a much larger array containing many thousands of synapses can be fabricated. Although the memristor and H-tree conductance as well as spike pattern sparsity introduce constraints, for example a 256× 256 array could support one AHaH node of 65,536 synapses or 65,536 single-synapse AHaH nodes, or any other partitioning.

Figure 2:
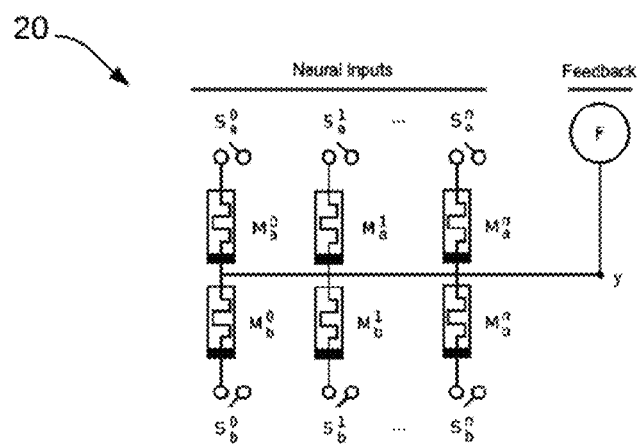
FIG. 2 illustrates a schematic diagram of an AHaH circuit, in accordance with an alternative embodiment.

FIG. 2 shows a model of an AHaH circuit 20, in accordance with an alternative embodiment. The AHaH circuit 20 shown in FIG. 2 has one common node linking n synapses, with k active inputs and n-k inactive (floating) inputs at any given time. The individual gated switches for activating spike inputs are labeled $S^0, S^1, \ldots S^n$. Each synapse is made up of two serially connected memristors labeled $M^0, M^1, \ldots M^n$. The driving voltage source for supervised and unsupervised learning is labeled F. The subscript values a and b indicate the positive and negative dissipative pathways, respectively.

An AHaH node is the basic building block of AHaH computing. Thermodynamic RAM provides a physical substrate for forming AHaH nodes (neurons) made up of serially-connected memristor pairs (synapses). The individual neural inputs corresponding to an incoming sparse-encoded spike stream are activated using standard RAM address mapping. The common electrode labeled 'y' serves as both a node for summing the weights of the activated synapses and also for delivering learning feedback to the synapses.

The substantial cost of hardware, let alone the cost of new hybrid memristor-CMOS hardware, provides tremendous inhibitory pressure to the realization of an NPU. On the one hand an NPU design needs to justify its existence by demonstrating utility across one or more application spaces. On the other hand, one cannot develop applications without the hardware. We believe we have found a solution to this chicken-and-egg problem in the form of a digital kT-RAM emulator.

The AHaH circuit is very simple, and we have exploited this simplicity to create an efficient digital emulator with benchmarked capabilities in machine learning. The digital emulator assumes an ideal circuit with memristors of various resolutions. The 'Nibble Core', for example, treats each memristor as having 16 discrete states and can store a synapse with one byte. The 'Byte Core' treats memristors as having 256 discrete states and can store a synapse with two bytes. The 'Float Core' uses floating-point precision and provides a point of correspondence to our analog emulator, where runtime computational efficiency gives way to accurate models of real-world memristors and non-ideal circuit effects. Each core accepts the same instruction set, which allows us to develop real-world applications with efficient cores (Nibble and Byte), while insuring a connection to the foundational hardware.

Application developers can commence with building a market for kT-RAM on existing hardware platforms (smart phones, servers, etc.) while hardware developers can work to build next-generation emulators. Importantly, hardware developers can look to the application developers to see where the application spaces actually are and what is, and is not, useful to real-world problems. Although memristive kT-RAM is the long term goal, multiple generations of pure digital kT-RAM emulators can be built, each offering various trade-offs in terms of bandwidth, memory and power. Through adherence to the kT-RAM instruction set, programs can be ported from one technology generation to another and multiple industry participants can coordinate their actions across the whole technology stack. Developments at the hardware level can be informed by the application level, where utility is demonstrated, and innovations at the hardware level can propagate back to the application level.

Thermodynamic RAM performs an analog sum of currents and adapts physically, eliminating the need to compute and write memory updates. One can theoretically exploit the kTRAM instruction set (Table I) however they wish. However, to prevent weight saturation, one must pair 'forward' instructions with 'reverse' instructions. For example, a forward-read operation FF should be followed by a reverse operation (RF, RH, RL, RZ, RA or RU) and vice versa. The only way to extract state information is to leave the feedback voltage floating, and thus there are two possible read instructions: FF and RF. There is no such thing as a 'non-destructive read' operation in kT-RAM. Every memory access results in weight adaptation according to AHaH plasticity. By understanding how the AHaH rule works (AHaH Computing), we can exploit the weight adaptations to create, among other things, 'self-healing hardware'.

TABLE I

KT-RAM INSTRUCTION SET

| Instruction | Synapse Driving Voltage | Feedback Voltage (F) |
|---|---|---|
| FF | Forward-Float | None/Floating |
| FH | Forward-High | −V |
| FL | Forward-Low | +V |
| FU | Forward-Unsupervised | −V if y ≥ 0 else +V |
| FA | Forward-Anti-Unsupervised | +V if y ≥ 0 else −V |
| FZ | Forward-Zero | 0 |
| RF | Reverse-Float | None/Floating |
| RH | Reverse-High | −V |
| RL | Reverse-Low | +V |
| RU | Reverse-Unsupervised | −V if y ≥ 0 else +V |
| RA | Reverse-Anti-Unsupervised | +V if y ≥ 0 else −V |
| RZ | Reverse-Zero | 0 |

As indicated previously, Thermodynamic RAM plugs into existing computing architectures. The envisioned hardware format is congruent with standard RAM chips and RAM modules and would plug into a motherboard in a variety of different ways. In general there are two main categories of integration. First, kT-RAM is tightly coupled with the CPU, on the CPU die itself or connected via the north bridge. In this case, the instruction set of the CPU would have to be modified to accommodate the new capabilities of kTRAM. Secondly, kT-RAM is loosely coupled as a peripheral device either connected via the PCI bus, the LPC bus, or via cables or ports to the south bridge. In these cases, no modification to the CPU's instruction set would be necessary, as the interfacing would be implemented over the generic plug in points over the south bus. As in the case with other peripheral devices, a device driver would need to be developed. Additional integration configurations are also possible. Given the above hardware integration, kT-RAM simply becomes an additional resource that software developers have access to via an API. In the meantime, kT-RAM is implemented as an emulator running on von Neumann architecture, but the API will remain the same. Later, when the new NPU is available, it will replace the emulator, and existing programs will not need to be rewritten to benefit from the accelerated capabilities offered by the hardware. In any case, kT-RAM operates asynchronously. As new spike streams arrive, the driver in control of kT-RAM is responsible for activating the correct synapses and providing the AHaH controller with an instruction pair for each AHaH node. The returned activation value can then be passed back to the program and used as needed. The following steps are carried out by the system to process spike streams:

1) Sequentially load all active synapses corresponding to spike stream
2) Provide the AHaH controller with an instruction or instruction pair (read-write)
3) The AHaH controller executes the supplied read instruction
4) Receive the AHaH node's activation value (confidence) from the AHaH controller
5) The AHaH controller executes the supplied write instruction (if provided)

The pseudo code shown below is an example that indicates how to construct a multi-label on-line classifier in software by loading spikes and executing instructions in the kT-RAM instruction set, in accordance with an alternative embodiment.

```
1:   procedure CLASSIFY (activeSpikes set S, truthLabels set L)
2:       for Each AHaH Node N do
3:           KTRAM.loadSpikes(N, S)
4:           y ← KTRAM.execute(N, FF)  forward read
5:           if supervised then
6:               if N ∈ L then
7:                   KTRAM.execute (N, RH)
8:               else if y ≥ 0 then          false-positive
9:                   KTRAM.execute (N, RL)
10:              else                         true-negative
11:                  KTRAM.execute (N, RF)
12:              end if
13:          else                             unsupervised
14:              KTRAM.execute (N, RF)
15:          end if
16:      end for
17:  end procedure
```

The network topology of the classifier is simply N AHaH nodes with M synapses, where N is the number of labels being classified and M is the number of unique spikes in the entire spike stream space. The active spikes S, a subset of M, is loaded onto each AHaH, and the execute method returns the voltage on the AHaH node's output electrode, y. Although all the AHaH nodes may exist on the same physical chip and share the same output electrode, temporal partitioning, as described above, allows for a virtual separation of AHaH nodes.

The Mixed National Institute of Standards and Technology (MNIST) database is a classic dataset in the machine learning community. It is composed of 60,000 train and 10,000 test samples of handwritten digits, each containing a digit 0 to 9 (10 classes). The 28×28 pixel grayscale images have been pre-processed to size-normalize and center the digits.

Our approach to the MNIST benchmark is to couple decision trees acting as feature learners to a back-end classifier. We have ported multiple variants of adaptive decision trees, as well as the classifier, to the kT-RAM instruction set. For the work presented here we opted for a simple and computationally efficient decision tree to reduce the computational load and allow us to run sweeps focusing on unsupervised classifier adaptation.

The classification procedure is to (1) spike-encode the data and (2) perform a multi-label classification of the resulting spike stream. The mechanisms of the spike encoding strongly affect the resulting classification performance, both in terms of error rate but also computational efficiency. The optimal spike encoding method is determined by the problem constraints. The encoding can be done automatically or manually. The former entails feature learning or selection, and the latter entails feature engineering.

We first create binary representations of each image by thresholding pixels exceeding a value of ten. The output of this thresholding over an image patch of 8×8 pixels produces a spike stream with a space of 64 channels. This spike stream is in turn fed into a simple random spike decision tree, where each node in the tree is looking for the presence of a spike on one spike channel. The leaves of the decision tree encode features, and these 'feature spike streams' were joined with pooling coordinates to produce a final output spike stream that was fed to the classifier. Each spike in the final spike stream represents the presence of a feature in a non-overlapping pooling region (8×8 pixels). This architecture could be compared roughly to a simple convolutional neural network.

Our choice of the non-adaptive random decision tree (feature engineering) is motivated by the desire to isolate adaptation to the classifier so we can study the effects of unsupervised adaptation on classification performance. AHaH attractor states have been proven to be computationally complete, which means that a decision tree formed of AHaH nodes in various configurations is capable of performing a very large number of possible feature encodings. We have only just begun exploring the space.

The output of the classifier produces a list of AHaH node 'activations' in the form of voltages. The more positive the voltage, the more likely that it is correct. By increasing a confidence threshold, one can increase the classification precision at the expense of reducing recall. Since the choice of confidence threshold is arbitrary, we report here the peak F1 score.

In the absence of any training labels, each AHaH node in the classifier receives an FF-RF instruction sequence, which amounts to a forward voltage to read the node state followed by a reverse voltage without feedback. This instruction sequence is carried out during the test phase of the classification and the RF operation is necessary to prevent the memristors from saturating. Depending on the initial state of the synapses and the evaluation voltage, the synapses will slightly adapt, meaning there is no possible way to perform a non-destructive read operation. While one might assume a read operation that adapts the memristors' state is detrimental, this adaptation actually improves the classifier's performance indicating that a slight dose of on-line unsupervised learning occurs by just reading.

Figure 3:
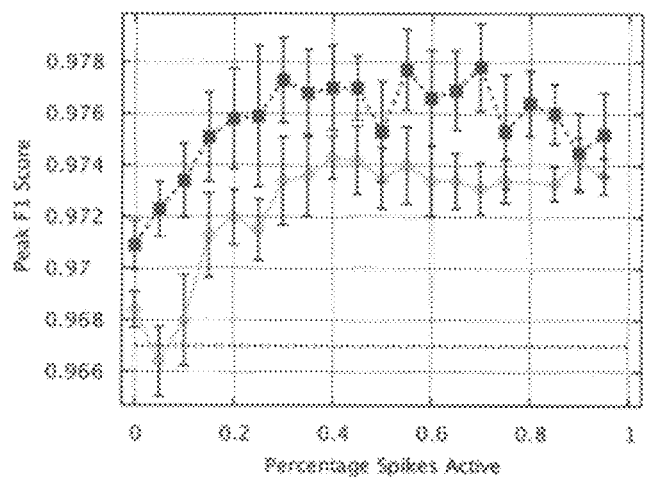
FIG. 3 illustrates a graph indicating that for each training exemplar, a spike stream is classified, in accordance with an alternative embodiment.

This mechanism can be taken advantage of to further improve the results of the MNIST classification benchmark by performing a series of unsupervised classifications on subsets of the original spike stream during the training phase. We extended the baseline classifier procedure as depicted in FIG. 3 so that during the train phase an extra classification was performed. For each training exemplar, the base supervised classification was performed followed by another classification with a randomly-chosen subset of the original spike stream's activated spikes. We varied this amount from 0 to 100%. We also tested two variations of this, where the spikes subset was either reclassified either via 'unsupervised' (FF-RF) or 'supervised' (see FIG. 3). Each configuration was repeated 10 times each experiment included 3 training epochs over a reduced set of 10,000 training and 1,000 test images. The reduced train and test set was motivated by the need to speed up total experiment time.

FIG. 3 illustrates a graph 30 indicating that for each training exemplar, a spike stream is classified, in accordance with an alternative embodiment. As shown in FIG. 3, the baseline classification F1 score for 10,000 training images and 1,000 test images was 0.967. This is close to previous results (0.98-0.99) not using the kT-RAM emulator. The degradation is due to the reduced training test set. It can be seen that reclassifying a subset of each exemplar's spike set during the train phase improves the results beyond the baseline.

Furthermore, the unsupervised version outperformed the supervised version. In general a percentage of active spikes used for the reclassification of 0.3 to 0.7 gave the best results. The kT-RAM classifier is therefore capable of self-optimizing its performance in an unsupervised way. Using the full dataset, increasing the number of training epoch, using overlapping pooling regions in the spike-encoding step, and implementing the unsupervised reclassification can all boost the classifier's error rate to below 1%.

In this paper, we have proposed one possible hardware implementation of AHaH Computing, which we call Thermodynamic RAM or kT-RAM for short. While a detailed description of the chip design is beyond the scope of this paper, an overview of how standard RAM can be modified to create kT-RAM was given. Additionally, we described how kTRAM can be plugged into existing digital computing platforms in a similar way as RAM and RAM modules. Whether kTRAM is integrated directly into a CPU's die, or it is off board as a peripheral device or anything in between, the kTRAM instruction set provides a minimal and complete API for integrating the chip into existing systems for accelerating machine learning tasks where large scale adaptive networks becomes a bottleneck in typical von Neumann architecture. Writing software to utilize kT-RAM will only require the addition of the new API. Our kT-RAM emulator allows us to develop applications, demonstrate utility, and justify a large investment into chip development. When chips are available, existing applications using the emulator API will not have to be rewritten in order to take advantage of new hardware acceleration capabilities.

In addition, we report that we have successfully ported all of our previous examples of AHaH computing machine learning capabilities to use our new kT-RAM emulator including classification, prediction, clustering, robotic control, and combinatorial optimization. The software procedure for implementing a classifier with kT-RAM and the instruction set was given as pseudo code, and it shows how the spike streams and truth labels (for supervised learning) are processed. Choosing one application, the MNIST hand written digital classification benchmark, it was shown that classification results using the kT-RAM emulator are congruent with previously published results. The classification benchmark was extended to show that the act of reading the synaptic states of AHaH nodes results in plasticity that improves the classifier's performance.

The classifier demonstration example discussed represents just one network topology and one basic capability of the cortex, but all the machine learning capabilities reported have been successfully ported over to the kT-RAM emulator. Different topologies implemented by different procedures and via the described AHaH node temporal partitioning can be utilized for a wide range of cortical capabilities. Because the network topology is defined in software and not 'hard-coded' in kT-RAM circuitry, any topology can be created, explored and tested. This flexibility reminds one of the advantages and attractiveness of the CPU—it is a jack of all trades and master of none. This is not to say that kT-RAM could not be redesigned to an application specific version, just as ASICs are optimized circuits that are designed to do one thing well. Substantial work remains in hardware design and fabrication and more generally in further developing AHaH Computing. The simplicity of Thermodynamic RAM, combined with the fact that we have demonstrated a number of machine learning capabilities leads us to conclude that this work will be well worth the effort.

It will be appreciated that variations of the above-disclosed and other features and functions, or alternatives thereof, may be desirably combined into many other different systems or applications. It will also be appreciated, that various presently unforeseen or unanticipated alternatives, modifications, variations or improvements therein may be subsequently made by those skilled in the art, which are also intended to be encompassed by the following claims.

The invention claimed is:

1. A thermodynamic RAM apparatus, comprising:
   a collection of thermodynamic cores; and
   a plurality of common read out electrodes, wherein each thermodynamic core among said collection of thermodynamic cores comprises a physical substrate of individually addressable adaptive synapses that are selectively coupled to said plurality of common read-out electrodes, and wherein said physical substrate provides a synaptic integration and a learning resource for digital computing platforms.

2. The thermodynamic RAM apparatus of claim 1 wherein said individually addressable adaptive synapses comprise memsistors.

3. The thermodynamic RAM apparatus of claim 1 wherein said individually addressable adaptive synapses comprise transistors.

4. The thermodynamic RAM apparatus of claim 1 wherein said each thermodynamic core is emulated with digital electronics.

5. A method for synaptic integration and learning with thermodynamic RAM, said method comprising:
   coupling individual synaptic elements to common driving electrodes; and
   executing at least one instruction via an AHaH (Anti-Hebbian and Hebbian) controller to drive said common driving electrodes.

6. A thermodynamic RAM apparatus, comprising
   physical substrate of addressable adaptive synapses that are partitioned to emulate adaptive neurons of arbitrary sizes, wherein said physical substrate mates electronically with a digital computing platform for neuromorphic adaptive learning applications.

7. The thermodynamic RAM apparatus of claim 6 wherein said physical substrate addressable adaptive synapses are configured as a part of a memristor-based physical neural processing unit.

8. The apparatus of claim 2 wherein at least one thermodynamic core among said plurality of thermodynamic cores comprises a nibble core that treats said memristors as having at most 16 discrete states and which stores a synapse with at most one byte.

9. The apparatus of claim 2 wherein at least one thermodynamic core among said plurality of thermodynamic cores comprises a byte core that treats said memristors as having at most 256 discrete states and which stores a synapse with at most two bytes.

10. The apparatus of claim 2 wherein at least one thermodynamic core among said plurality of thermodynamic cores comprises a float core that treats said memristors as having a floating-point representation and which stores a synapse with two floating point numbers.

11. The apparatus of claim 2 wherein at least one thermodynamic core among said plurality of thermodynamic cores comprises:
   a nibble core that treats each memristor among said memristors as having discrete states and wherein each nibble core stores a synapse with at most one byte;
   a byte core that treats said memristors as having at most 256 discrete states and which stores a synapse with at most two bytes; and
   a float core treats said memristors as a floating point number and which stores a synapse with at most two floating point numbers.

* * * * *